United States Patent [19]

Lehmann et al.

[11] Patent Number: 4,592,249

[45] Date of Patent: Jun. 3, 1986

[54] SHIFT ROD POSITION INDICATION SYSTEM

[75] Inventors: Ulrich Lehmann, Weissach; Hans Weigele, Stuttgart, both of Fed. Rep. of Germany

[73] Assignee: Dr. Ing.-H.c.F. Porsche Aktiengesellschaft, Fed. Rep. of Germany

[21] Appl. No.: 600,817

[22] Filed: Apr. 16, 1984

[30] Foreign Application Priority Data

Apr. 19, 1983 [DE] Fed. Rep. of Germany ....... 3314111

[51] Int. Cl.⁴ ............... G05G 9/12; B60K 23/00; H01L 43/08
[52] U.S. Cl. ............... 74/473 R; 74/DIG. 7; 116/28.1; 192/30 W; 200/61.91; 324/208; 338/32 R; 340/52 R
[58] Field of Search .......... 74/473 R, DIG. 7; 116/28.1, DIG. 20; 192/30 W; 200/61.88, 61.91; 338/32 R, 32 H; 340/52 R, 70; 324/208

[56] References Cited

U.S. PATENT DOCUMENTS

| | | | |
|---|---|---|---|
| 3,943,792 | 3/1976 | Sibeud | 74/DIG. 7 X |
| 4,037,196 | 7/1977 | Atkinson et al. | 200/61.88 X |
| 4,142,152 | 2/1979 | Fincher | 340/70 X |
| 4,340,133 | 7/1982 | Blersch | 192/30 W |
| 4,393,285 | 7/1983 | Hiraiwa et al. | 200/61.91 X |
| 4,471,304 | 9/1984 | Wolf | 338/32 H X |

FOREIGN PATENT DOCUMENTS

| | | | |
|---|---|---|---|
| 75693 | 4/1983 | European Pat. Off. | |
| 3218143 | 11/1983 | Fed. Rep. of Germany | 116/28.1 |
| 137648 | 8/1983 | Japan | 74/473 R |
| 2028513 | 3/1980 | United Kingdom | 340/52 R |
| 2058963 | 4/1981 | United Kingdom | |

OTHER PUBLICATIONS

"In Einem Zug", Auto Motor Sport, 1984.
"Elektronische Regelung Eines Doppelkupplungs-Getriebes", VDI-Berichte Nr. 466, 1983.
"Porsche Double-Clutch Transmission (PDK)—An Alternative Transmission Concept", XIX International Fisita Congress, Nov. 1982.

Primary Examiner—Allan D. Herrmann
Attorney, Agent, or Firm—Barnes & Thornburg

[57] ABSTRACT

A shift rod position indicator system for an automotive vehicle transmission includes a plurality of position sensors fixed to the housing of the transmission and actuating means moved by shift rods in proximity to the sensors which generate an electrical signal according to the displacement of the shift rod during the shifting operation, the electrical signal corresponding with initial and full engagement of the gear, the signal being maintained over the extent of gear engagement to provide an electronic control circuit with information so as to permit the synchronized operation of clutches to effect a semi-automatic gear change.

8 Claims, 9 Drawing Figures

SHIFT ROD POSITION INDICATION SYSTEM

BACKGROUND AND SUMMARY OF THE INVENTION

This invention relates generally to a system for use with automotive vehicle transmissions for indicating the position of the shift rod which manipulates the gear train contained within the transmission. The system has particular utility in such transmissions which include a twin clutch mechanism having a control circuit for automatically activating the clutch mechanism, the control unit being electrically fed by signals from the indication system of the present invention.

Conventional semi-automatic transmissions for use in automotive vehicles typically employ a twin-clutch mechanism which operates to decouple the transmission from the power train during gear change or selection. To achieve automatic shifting between the individual gear stages, it is necessary that the respective positions of the gear wheel pairs and/or the gear shift sleeves be recognized so as to provide for the synchronized operation of the two clutches. Thus, an object of the present invention is to provide means for controlling the twin-clutch actuation so as to permit smooth semi-automatic shifting of the gears within the transmission.

In order to attain this object, an indication system is provided within the transmission which system indicates the position of the shift rods and comprises generally a plurality of sensors fixed to the housing of the transmission in spaced relation to each other and actuating means moved by the shift rods for actuating the sensors. The sensors preferably comprise electrical elements having a magnetic field controlled resistance. Such magnetoresistors can be actuated by magnetically conductive metal surfaces positioned adjacent the sensors by the shifting rod on which they are mounted.

In a typical transmission employing the present invention, a plurality of shift rods are present. The gear train is arranged in sets of two gears each, each two gear set being operated by a selected one of the shift rods. The plurality of sensors are arranged on the transmission housing in sets of at least three sensors, each set of sensors being responsive to two adjacent actuating means which are mounted for movement with a single shift rod. Each actuating means can preferably operate on at least two of the sensors.

The apparatus of the present invention makes it possible to transmit electrical signals which depend upon and hence reflect the movement of the shift rods. In a twin-clutch transmission, the instantaneous engagement position of the teeth of the two gear sets is signaled during the shifting operation so that a corresponding synchronized operation of the two clutches can take place. The electrical signal is maintained until the teeth of the two-gear set is safely meshed with one another or, conversely, are safely separated from one another. Alternatively, it is also possible to effect a signal transmission at a point in time when the earliest effective torgue-transmitting engagement of the gear pair occurs. This signal transmission, beginning at the preliminary engagement and continuing through the final engagement of the gear set, ensures smooth automatic shifting from one gear to the other gear within the transmission.

Additional features and advantages of the invention will become apparent to those skilled in the art upon consideration of the following detailed description of an illustrative preferred embodment exemplifying the best mode of carrying out the invention as presently perceived. The detailed description particularly refers to the accompanying figures.

DETAILED DESCRIPTION OF THE FIGURES

Figure 1:
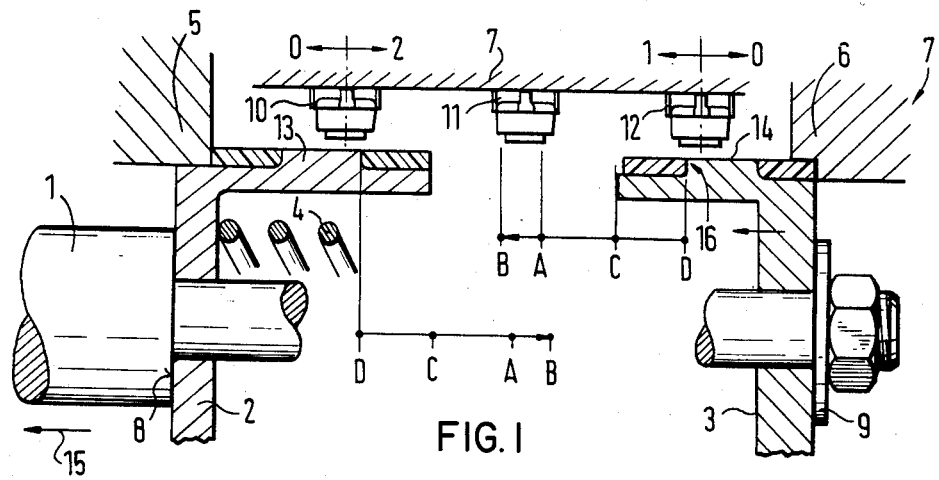
FIG. 1 is a schematic illustration of a transmission particularly showing the shift rod for the first and second gear stages, the transmission including position sensors and actuating means in accordance with the present invention, the shift rod being situated in a neutral or idle position.

A shift rod 1 for actuation of both the first and second gears of a twin-clutch transmission is shown in FIG. 1. Further details of the twin clutch transmission are not illustrated since the present invention can be understood in their absence. In general, the shift rod 1 is connected to a gear shift which in turn engages a shifting sleeve of a synchronizer. By displacing the shifting sleeve a pair of gear wheels are moved with respect to each other into or out of coengagement. The longitudinal movement of the shift rods 1 typically take place by hydraulic actuations. The shift rods 1 are secured in their in positions by corresponding stops. The foregoing elements of the transmission other than the shift rod are conventional and believed to be within the understanding of one ordinarily skilled in the present art.

The shift rod 1 carries at one end two opposed cup shaped elements 2 and 3 which are separated by the biasing of spring 4 against stops 5 and 6 of the housing 7 of the transmission. The cup-shaped element 2 is resiliently supported on collar or step 8 of the shift rod 1 while element 3 is supported by disk or washer 9 secured to the end of shift rod 1 by a screw threaded nut or the like. Thus, leftward movement of shift rod 1 in the direction 15 causes cup shaped element 3 to move to the left while cup shaped element 2 is retained in the illustrated position by stop 5. Alternatively, movement of shift rod 1 to the right of the position illustrated in FIG. 1 causes element 2 to move to the right while element 3 remains in the illustrated position by virtue of its contact with stop 6.

Three position sensors 10, 11, and 12 are arranged on the housing 7 in spaced side-by-side relationship. The sensors 10, 11, and 12 are actuated by two actuators 13 and 14 which are on the annular portion of the cup-shaped elements 2 and 3, respectively. The sensors 10, 11, and 12 are preferably magnetoresistors, that is, electrical devices in the nature of variable resistors, the resistance of which is magnetic field-controlled. The position sensors are actuated by means of the actuators 13 and 14 which are each shown to comprise annular metal rings of magnetically conductive material. The position sensors 10, 11, and 12 are positioned such that they transmit electrical signals at the positions A, B, C, and D which positions indicate certain instantaneous positions during the engagement or disengagement of the correlated gear set. The four positions A, B, C, and D illustrated on the upper right of FIG. 1 pertain to the engagement and disengagement of the first gear while the four positions A, B, C, and D illustrated in the lower left of FIG. 1 pertain to the engagement and disengagement of a second gear. The actuators 13 and 14 are of such a size and are arranged at such a distance from the sensors 10, 11, and 12 that the necessary hysteresis results at the positions A, B, C, and D as indicated. While the operation of cup-shaped element 3 will be further described in detail in connection with FIGS. 2a, 2b–5a, 5b a similar operation is achieved by cup-shaped element 2.

Figure 2A:
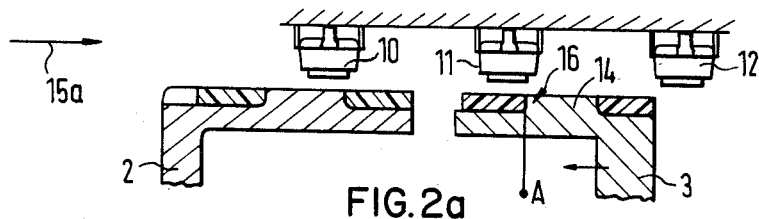
FIGS. 2a and 2b show a schematic illustration of a transmission as in FIG. 1 with the shift rod situated such that a first gear set is preliminarily engaged.
Figure 3A:
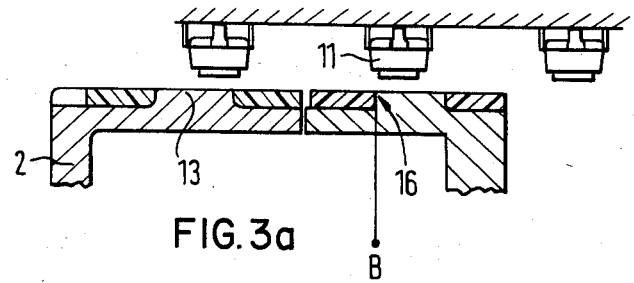
FIGS. 3a and 3b show a schematic illustration of a transmission as in FIG. 1 with the shift rod situated such that a first gear set is completely engaged.
Figure 4A:
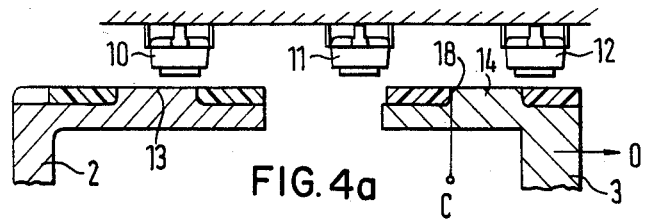
FIGS. 4a and 4b show a schematic illustration of a transmission as in FIG. 1 with the shift rod situated between the first gear engaging position and the idling position which effects the transmission of an electrical signal indicating preliminary disengagement.
Figure 5A:
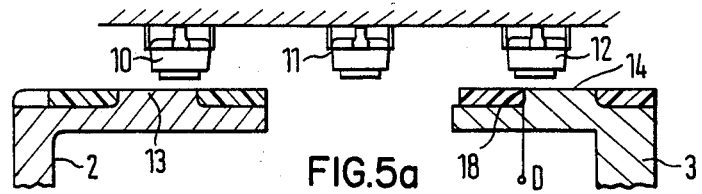
FIGS. 5a and 5b show a schematic illustration of a transmission as in FIG. 1 with the shift rod situated in the idle position for transmission of electrical signal indicating final disengagement.
Figure 2B:
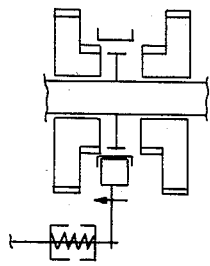
Figure 3B:
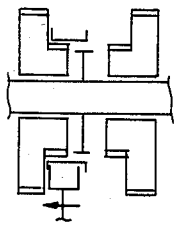
Figure 4B:
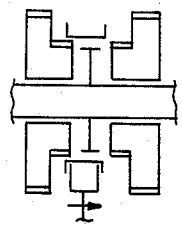
Figure 5B:
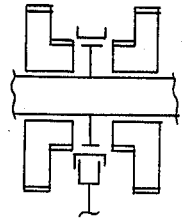

As the shift rod 1 is moved in direction 15 carrying with it actuating means 14 as shown in FIG. 2a sensor 11 senses this displacement as the leading edge 16 of the actuating means 14 arrives at position A. At this point, the resistance of sensor 11 changes so as to transmit an electrical signal to an electronic control circuit (not shown). This electrical signal indicates that the two-gear set of the first gear is positioned in an initial torgue transmitting preliminary engagement. As the shift rod 1 moves further in the direction 15 as shown in FIG. 3a the two gear set defining a first gear further meshes together until the leading edge 16 of the actuating means 14 comes into position B. During this further intermeshing, the sensor 11 continuously maintains the electrical signal so as to indicate this further intermeshing operation until the leading edge 16 of actuator 14 arrives at point B. This signal indicates that the gears have been securely intermeshed along the entire tooth width.

A similar signal transmission also takes place during disengagement and is examined in connection with FIGS. 4a, 4b, 5a and 5b. As the shift rod 1 is displaced from the position shown in FIG. 3a the direction 15a, the rear edge 18 of the actuating means 14 triggers sensor 12. Once this control edge 18 has arrived at point C, sensor 12 transmits an electrical signal to an electronic control circuit, not shown. This electrical signal is maintained until the control edge 18 arrives at position D shown in FIGS. 1 and 5a.

In a complete transmission incorporating the present invention, other shifting rods for further gear stages such as third and fourth gears, as well as for fifth gear and reverse gear, are also provided with similar sensors and actuating means to supply appropriate signals to the control circuit. In a typical transmission, the dimensions of the sensor and actuating means are such that points A and B are separated by approximately 2.0 mm with point A being located approximately 7.5 mm from the rest position shown in FIG. 1. The control point D is located at the rest position while control point C is at about 3.5 mm from the rest position.

Although the invention has been described in detail with references to a specific preferred embodiment, variations and modifications exist within the scope and spirit of the invention as described and as defined in the following claims:

What is claimed is:

1. A shift rod position indicator system for an automotive vehicle transmission having at least one gear set operated by a shift rod, comprising:
   a plurality of sensors fixed to a housing of the transmission in spaced relation to each other; and
   actuating means moved by the shift rod for actuating the sensors;
   wherein said sensors and actuating means are arranged such that a first electrical signal is produced when the shift rod is operated so as to partially engage the gear set, and a second electrical signal is produced when the shift rod is operated so as to fully engage the gear set.

2. The apparatus of claim 1, wherein said sensors and actuating means are arranged such that a first electrical signal is produced when the shift rod is operated so as to partially disengage the gear set, and a second electrical signal is produced when the shift rod is operated so as to fully disengage the gear set.

3. A shift rod position indicator system for an automotive vehicle transmission, comprising a plurality of sensors fixed to a housing of the transmission in spaced relation to each other and actuating means moved by a shift rod for actuating at least one of the sensors, said plurality of sensors being arranged in sets of at least three sensors, each set of sensors being responsive to two adjacent actuating means on the same shift rod, each actuating means operating on at least two of the corresponding sensors.

4. The apparatus of claim 1, wherein the actuating means comprises an annular magnetically conductive metal surface positioned by the shift rod, and wherein the sensors each comprise a magnetoresistor having a magnetic field-controlled resistance.

5. The apparatus of claim 1, wherein the sensors and actuating means are situated such that a first electrical signal is transmitted by a sensor when a corresponding set of two gears is partially engaged and a second electrical signal is transmitted by a sensor when the set of two gears is fully engaged.

6. The apparatus of claim 1, wherein the plurality of sensors and actuating means are situated such that an electrical signal is transmitted by at least one of the sensors as the shift rod is moved from a gear engaged position to a gear idling position.

7. The apparatus of claim 4, wherein the plurality of sensors and actuating means are situated such that an electrical signal is transmitted by at least one of the sensor as the shift rod is moved from a gear engaged position to a gear idling position.

8. The apparatus of claim 4, wherein the sensors are triggered by the passing leading edge of an actuating means and relaxed by the passage of a trailing edge of an actuating means.

* * * * *